United States Patent
Pfadler et al.

(10) Patent No.: US 11,943,664 B2
(45) Date of Patent: Mar. 26, 2024

(54) METHOD AND APPARATUS FOR MANAGING A COMMUNICATION BETWEEN A BASE STATION OF A CELLULAR MOBILE COMMUNICATION SYSTEM AND AT LEAST ONE MOVING COMMUNICATION PARTNER, COMPUTER PROGRAM, APPARATUS FOR PERFORMING STEPS OF THE METHOD, AND A VEHICLE

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE); Andreas Kwoczek, Lehre (DE); Israel Gonzalez Vazquez, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 244 days.

(21) Appl. No.: 17/224,273

(22) Filed: Apr. 7, 2021

(65) Prior Publication Data
US 2021/0337431 A1 Oct. 28, 2021

(30) Foreign Application Priority Data
Apr. 27, 2020 (EP) .................... 20171679

(51) Int. Cl.
*H04W 4/40* (2018.01)
*H04B 17/373* (2015.01)
(Continued)

(52) U.S. Cl.
CPC .......... *H04W 28/24* (2013.01); *H04B 17/373* (2015.01); *H04W 4/40* (2018.02); *H04W 28/0226* (2013.01); *H04W 28/0268* (2013.01)

(58) Field of Classification Search
CPC ....... H04W 28/24; H04W 28/16; H04W 4/40; H04W 4/46; H04W 28/0268; H04W 28/0226; H04B 17/373
See application file for complete search history.

(56) References Cited

U.S. PATENT DOCUMENTS

| 11,096,064 B2 | 8/2021 | Jornod et al. |
| 11,223,969 B2 | 1/2022 | Zielinski et al. |

(Continued)

FOREIGN PATENT DOCUMENTS

| CN | 105049872 A | 11/2015 |
| CN | 105307216 A | 2/2016 |

(Continued)

OTHER PUBLICATIONS

Gutierrez-Estevez et al.; Nonparametric Radio Maps Reconstruction Via Elastic Net Regularization with Multi-Kernels; 2018 IEEE 19th International Workshop on Signal Processing Advances in Wireless Communications (SPAWC); IEEE; 2018.

(Continued)

*Primary Examiner* — Jinsong Hu
*Assistant Examiner* — Farideh Madani
(74) *Attorney, Agent, or Firm* — Barnes & Thornburg LLP (57) ABSTRACT

A method for managing a communication between a base station of a cellular mobile communication system and at least one first moving communication partner. The method includes collecting service quality reporting messages from moving communication partners, registered in the communication cell managed by the base station, wherein the collecting service quality reporting messages include collecting service quality reporting messages for direct communications between two moving communication partners and generating link-based quality of service maps for the (Continued)

communications between the base station and the moving communication partners, as well as for the direct communications between two of the moving communication partners. The method also includes predicting the quality of service for a communication between the base station and at least one moving communication partner based on the generated link-based quality of service maps map.

16 Claims, 6 Drawing Sheets

(51) Int. Cl.
  *H04W 28/02* (2009.01)
  *H04W 28/24* (2009.01)

(56) References Cited

U.S. PATENT DOCUMENTS

| | | | |
|---|---|---|---|
| 2002/0029108 A1* | 3/2002 | Liu | G01C 21/26 701/410 |
| 2009/0011785 A1 | 1/2009 | Celebi et al. | |
| 2009/0117851 A1 | 5/2009 | Malaney | |
| 2018/0138965 A1 | 5/2018 | Martin | |
| 2018/0343598 A1 | 11/2018 | Xu et al. | |
| 2019/0011785 A1 | 1/2019 | Li et al. | |
| 2019/0124015 A1 | 4/2019 | Loehr et al. | |
| 2019/0281644 A1* | 9/2019 | Hu | H04B 7/15528 |
| 2020/0064864 A1 | 2/2020 | Franchi et al. | |
| 2020/0077278 A1 | 3/2020 | Jornod et al. | |
| 2020/0112841 A1 | 4/2020 | Kim et al. | |
| 2020/0229065 A1* | 7/2020 | Iwata | H04W 4/44 |
| 2020/0252941 A1 | 8/2020 | Schmidt et al. | |

FOREIGN PATENT DOCUMENTS

| | | |
|---|---|---|
| CN | 110858960 A | 3/2020 |
| CN | 110876147 A | 3/2020 |
| CN | 110996302 A | 4/2020 |
| CN | 110999391 A | 4/2020 |
| EP | 3253126 A1 | 12/2017 |

OTHER PUBLICATIONS

Ramya et al.; Online Learning Framework for V2V Link Quality Prediction; 2019 IEEE Global Communications Conference (GLOBECOM); IEEE; Dec. 9, 2019; pp. 1-6.
Search Report for European Patent Application No. 20171679.2; dated Oct. 7, 2020.
Office Action for Chinese Patent Application No. 202110459280.2; dated Apr. 6, 2022.

* cited by examiner

METHOD AND APPARATUS FOR MANAGING A COMMUNICATION BETWEEN A BASE STATION OF A CELLULAR MOBILE COMMUNICATION SYSTEM AND AT LEAST ONE MOVING COMMUNICATION PARTNER, COMPUTER PROGRAM, APPARATUS FOR PERFORMING STEPS OF THE METHOD, AND A VEHICLE

PRIORITY CLAIM

This patent application claims priority to European Patent Application No. 20171679.2, filed 27 Apr. 2020, the disclosure of which is incorporated herein by reference in its entirety.

SUMMARY

Illustrative embodiments relate to the technical field of applying relaying communication in a cellular mobile communication system. Illustrative embodiments provide a method and apparatus for managing a communication between a base station of a cellular mobile communication system and at least one moving communication partner. Illustrative embodiments also provide a corresponding computer program, an apparatus for performing the method and a transportation vehicle comprising such an apparatus.

BRIEF DESCRIPTION OF THE DRAWINGS

Exemplary embodiments are shown in the drawing and are explained in greater detail in the following description. In the drawings.

DETAILED DESCRIPTION

For the scenario of transportation vehicles equipped with wireless communication modules that provide connectivity to public communication networks, but also provide a direct communication capability for exchanging information among the road participants, wireless communication offers the opportunity to implement a wide range of applications. A lot of research concerns the fields of cooperative and autonomous driving. Direct communication between transportation vehicles is often referred to be vehicle-to-vehicle communication V2V. Also possible is communication from and to a transportation vehicle with infrastructure communication stations such as a road side unit RSU, also called V2I communication (vehicle-to-infrastructure). Both types of communication are very often referred to as V2X communication (vehicle-to-everything), comprising both V2V and V2I communication.

Within the concept of predicted Quality of Service (pQoS), the application supported by a communications system adapts its settings to the foreseen quality of service (QoS). The quality of the communication link is, therefore, critical, as the performance of the application is strongly dependent on it. To allow the application to cope with variations of the quality of service, pQoS provides an information on the future quality of the link. This information comes with a prediction horizon, that is the delta time in the future for which the predicted value is applicable. On another hand, the ability to predict the future QoS is an enabler for these applications, as they have the ability to cope with a drop in QoS performance in advance. Predicting future QoS in a network is facilitated by the static feature of one of the communication nodes, the base station. Known solutions use the study of the static (slow fading) properties of the surrounding of the base station.

A well-known technique to provide coverage in out of coverage areas is the so called relaying. Where one user at the edge of a cell (butt still in coverage) relays a link from the BS to a user which is out of coverage.

Currently the following mobile communication technologies are applicable for bringing connectivity to a transportation vehicle: 3GPP-based UMTS, HSPA, LTE, and the upcoming 5G standards.

For the V2V or V2X communication the following technologies are readily available: LTE-V sidelink communication, also called PC5 interface, 5G PC5 communication, WLAN p communication (IEEE 802.11p).

Communication standards define performance metrics for communication technologies, such as minimums, maximums, averages, etc. of some key performance indicators KPIs. The indicators, such as latency $\tau$ of a data communication, throughput Th, data rate DR, packet error rate PER, and packet inter-reception time PIR, vary within and around these values, sometimes drastically dropping or increasing. This variation can drastically affect the quality of applications. For safety-related applications, such as some applications of cooperative automated driving, the average achievable latency with best effort policy does not comply with the quality requirements of the automotive industry, for instance. Especially when it comes to V2V and V2X and time critical safety related applications, this potential variation and this absence of guarantee of quality of service QoS seriously affects the potential use of such technologies. One application that requires a high QoS is tele-operated driving, hereinafter abbreviated ToD.

In the field of communication prediction, QoS- and radio maps are state of the art tools that enable an adaptation to QoS variations. These maps may be generated by making use of knowledge about the environment as well as knowledge from statistical/historical data. Knowledge about the environment may be some shadowing effect prediction, white spot and static scatters mapping, and Doppler shift prediction caused by dynamic scatters like trucks, busses or other transportation vehicles building an obstacle for the direct communication to another transportation vehicle. Historical QoS data can be gathered by managing nodes, such as the base station eNodeB of the LTE mobile communication system, on the effective QoS and be mapped to the environment knowledge.

From US 2018/0343598 A1 an electronic device and a wireless communication method in a wireless communication system are known. The method comprises: acquiring scenario identification information, comprising first link information that indicates the quality of a link between the electronic device and a user equipment (UE), second link information that indicates the quality of a link between the electronic device and a base station, serving cell received power change rate information, and neighboring cell received power change rate information; and determine scenario information based on the scenario identification information, to inform the UE, so as to assist the UE to execute a relay reselection process, or to assist the electronic device to execute a relay selection process. By using the electronic device and the wireless communication method of the present disclosure, a remote UE is enabled to acquire a scenario in which the electronic device is located, so that the remote UE can better perform relay reselection or that the electronic device can better execute relay selection, thereby increasing the system performance and reducing overheads of an X2 interface.

From US 2019/0124015 A1 a transmitting device for transmitting vehicular data via a sidelink interface to one or more receiving devices is known. The transmitting device performs autonomous radio resource allocation for transmitting the vehicular data via the sidelink interface. An application layer generates the vehicular data and forwards the vehicular data together with a priority indication and one or more QoS parameters to a transmission layer responsible for transmission of the vehicular data via the sidelink interface. The transmission layer performs autonomous radio resource allocation based on the received priority indication and the one or more QoS parameters. The transmission layer transmits the vehicular data via the sidelink interface to the one or more receiving devices according to the performed autonomous radio resource allocation.

US 2009/0117851 A1 discloses a quality of service map for a wireless network. The map comprises several layers of information visible at the same time. A first layer is a diagram showing physical features within the space where communications are provided by a service provider. Additional layers indicate the value of respective quality of service metrics at locations indicated by the first layer. Users of mobile wireless devices within the network contract with the service provider to have one or more selected communications services delivered to the mobile device. The users also contract with the service provider to have the selected services provided at respective selected service levels. The service provider, or the user, or both, use information from the map to enable provision of the selected communications services at the respective selected service levels.

US 2019/0281644 A1 discloses a base station for cellular communication with a plurality of communication devices configured for D2D communication using a D2D communication channel. The base station comprises a communication interface configured to receive a request from the transmitter communication device, and a processor configured to select a subset of the plurality of relay communication devices for relaying the communication message to the at least one receiver communication device and to configure the subset of relay communication devices to relay the communication message using one of a plurality of relay modes.

The article R. M. Panthangi et al.: "Online Learning Framework for V2V Link Quality Prediction", 2019 IEEE Global Communications Conference (GLOBECOM 2019), discloses an approach for addressing the problem of predicting channel quality between transportation vehicles in terms of path loss, which exhibits strong fluctuations over time due to highly dynamic vehicular environments. The approach makes use of a framework for data-driven path loss prediction models that are obtained from datasets comprising information related to message transmissions and the communication scenario. By combining a changepoint detection method and online learning, the proposed framework adapts the current prediction model based on its performance, thus accounting for the dynamics in the environment and the cost of re-training.

EP 3 253 126 A1 discloses a method for route selection in a mobile communication system. The mobile communication system comprises a base station, relay nodes, and user equipment nodes. A user equipment node sends measurement reports to the base station concerning the channel quality of the direct communication path to the base station. The base station determines a route for the communication with the reporting user equipment based on the measurement reports.

Autonomous driving is on the rise. An automated transportation vehicle requires a certain QoS for an application (e.g., ToD) on a path via the Uu link. A threshold may be provided to perform a certain application, e.g., ToD. Applying this threshold to a predicted QoS profile it can be easily seen that this threshold will be violated and the application could not run properly. What is needed is a solution for the problem how to improve the communication performance for a communication between a base station and a moving communication partner and a solution for the problem how to make a QoS prediction for the communication between the transportation vehicle and the base station.

Disclosed embodiments provide a method and apparatus for managing a communication between a base station of a cellular mobile communication system and at least one moving communication partner, a corresponding computer program and a transportation vehicle.

At least one disclosed embodiment concerns a method for managing a communication between a base station of a cellular mobile communication system and a first moving communication partner. The method comprises:

collecting service quality reporting messages from a plurality of moving communication partners registered in a communication cell managed by the base station, the service quality reporting messages comprising service quality reporting messages for direct communications between two of the plurality of moving communication partners;

generating quality of service maps for the communications between the base station and the first moving communication partner, as well as for the direct communications between two of the moving communication partners;

receiving planned trajectories from the plurality of moving communication partners;

calculating predicted quality of service profiles for the communications between the base station and a moving communication partner as well as predicted quality of service profiles for the direct communications between the moving communication partners based on the generated quality of service maps and the planned trajectories, the predicted quality of service profiles representing a temporal evolution of at least one quality of service parameter;

receiving a request from the first moving communication partner for a communication between the base station and the first moving communication partner, the request demanding a high quality of service;

determining, based on the predicted quality of service profiles, if the high quality of service demanded by the request can be satisfied along the planned trajectory of the first moving communication partner by a direct communication between the base station and the first moving communication partner or by relaying the communication via one of the other moving communication partners; and establishing the communication between the base station and the first moving communication partner accordingly along the planned trajectory.

The extension of the QoS map generation to direct communication between the moving communication partners allows for an improvement of the service quality for a communication between base station and a moving communication partner. This is particularly helpful for applications with high demanding QoS requirements, such as the application of tele-operated driving where video and audio plus a control stream needs to be communicated.

For determining if the high quality of service demanded by the request can be satisfied along the planned trajectory of the first moving communication partner by a direct communication between the base station and the first moving communication partner, the at least one quality of service parameter represented by the predicted quality of service profile for the communication between the base station and the first moving communication partner is compared with a threshold representing a minimum requirement which the quality of service parameter should satisfy for the requested high demanding communication. This enables to decide if the direct communication between the base station and the first moving communication partner is able to provide for the required quality of service.

For determining if the high quality of service demanded by the request can be satisfied along the planned trajectory of the first moving communication partner by relaying the communication via one of the other moving communication partners, a moving communication partner in the vicinity of the first moving communication partner is selected, a combined predicted quality of service profile is calculated, the combined predicted quality of service profile representing a temporal evolution of at least one quality of service parameter when the communication is relayed via the selected moving communication partner, and the at least one quality of service parameter represented by the combined predicted quality of service profile is compared with the threshold. This allows for quickly deciding if relaying is an option to guarantee the required quality of service for high demanding communication applications.

The method further comprises recording a position or time information from which on the relayed communication should be started. This allows to switch seamlessly between direct communication and relayed communication if the switching point is registered beforehand.

The disclosed embodiments may be used in the field of V2X communication, where the moving communication partners are transportation vehicles equipped with an on-board communication module capable of performing transportation vehicle to everything communication V2X, including performing communication to the base station via Uu-link and direct communication from transportation vehicle to transportation vehicle via sidelink, e.g., PC5-link.

In at least one disclosed embodiment, the request demanding a high quality of service corresponds to a requested tele-operated driving session.

The disclosed embodiments also concern an apparatus for managing a communication between a base station of a cellular mobile communication system and a first moving communication partner, wherein the apparatus comprises a processing device which is adapted to perform a disclosed method. Such an apparatus may be exemplified with a base station computer.

Disclosed embodiments further concern a computer program comprising program code, which when run in a processing device, causes the processing device to perform the disclosed method.

Another exemplary embodiment concerns a transportation vehicle comprising a communication module and a processing device. The processing device is adapted to form a message for requesting a communication from or to the base station, the request demanding a high quality of service. The communication module hence is adapted to send the formed message to the base station and is adapted to receive a message from the base station informing about the need of a relayed communication for the requested communication demanding the high quality of service. Further on, the processing device is adapted to register the need of relayed communication in a memory, where the registering information includes a position information or time information from which on the relayed communication needs to be provided.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Thus, for example, it will be appreciated by those skilled in the art that the diagrams presented herein represent conceptual views of illustrative circuitry embodying the principles of the disclosure.

The functions of the various elements shown in the figures may be provided by the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a way for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited methods or mechanisms are combined and brought together in the way the claims call for. It is thus regarded that any method or mechanism that can provide those functionalities are equivalent to those shown herein.

Figure 1:
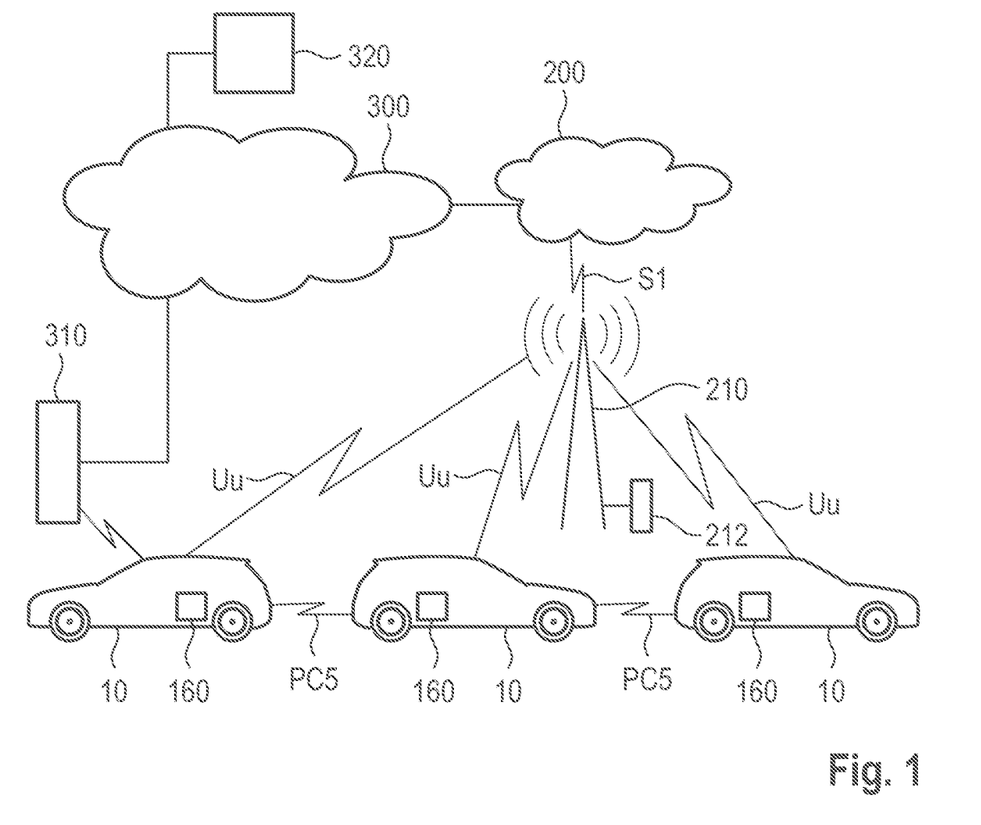
FIG. 1 illustrates the principle architecture of a V2V and V2X communication system.

FIG. 1 shows the system architecture for the proposal. Reference number 10 denotes a user device. The depicted user device is exemplified as a transportation vehicle and, more in particular, it is a car. In other examples it may be differently exemplified, e.g., a smart phone, a smart watch, a tablet computer, notebook or laptop computer or the like. Shown is a passenger car. If exemplified with a transportation vehicle, it may be any type of a vehicle. Examples of other types of vehicles are: buses, motorcycles, commercial vehicles, in particular trucks, agricultural machinery, construction machinery, rail vehicles, etc. The use of the disclosed embodiments would be generally possible in land vehicles, rail vehicles, watercrafts and aircrafts. The transportation vehicle 10 is equipped with an on-board connectivity module 160 including a corresponding antenna such that the transportation vehicle 10 can participate in any form of a mobile communication service. FIG. 1 illustrates that transportation vehicle 10 may transmit and receive signals to and from a base station 210 of a mobile communication service provider.

Such base station 210 may be, e.g., an eNodeB base station of an LTE (Long Term Evolution) or 5G mobile communication service provider. The base station 210 and the corresponding equipment are part of a mobile communication network with a plurality of network cells, where each cell is served by one base station 210.

The base station 210 in FIG. 1 is positioned close to one or a plurality of roads on which the transportation vehicles 10 are driving. Of course, other transportation vehicles may also drive on the road. In the terminology of LTE, a mobile terminal corresponds to an UE, which allows a user to access network services, connecting to the UTRAN or Evolved-UTRAN via the radio interface. Typically, such UE corresponds to a smart phone. Of course, mobile terminals are also used in the transportation vehicles 10. The cars 10 are equipped with the on-board connectivity module OCU 160. This OCU corresponds to an LTE or 5G communication module with which the transportation vehicle 10 can receive mobile data in downstream direction and can send such data in upstream direction.

In terms of the LTE mobile communication system, the Evolved UMTS Terrestrial Radio Access Network E-UTRAN of LTE consists of a plurality of eNodeBs, providing the E-UTRA user plane (PDCP/RLC/MAC/PHY) and control plane (RRC) protocol terminations towards the UE. The eNodeBs are interconnected with each other by the so-called X2 interface. The eNodeBs are also connected by the so-called S1 interface to the EPC (Evolved Packet Core) 200, more specifically to the MME (Mobility Management Entity) by the S1-MME and to the Serving Gateway (S-GW) by the S1-U interface.

From this general architecture, FIG. 1 shows that eNodeB 210 is connected to the EPC 200 via the S1 interface and that EPC 200 is connected to the Internet 300. A backend server 320, to which the transportation vehicles 10 may send messages to and receive messages from, is also connected to the Internet 300. In the field of cooperative and autonomous driving, the backend server 320 typically is located in a Control Center (CC). This also includes the application of tele-operated driving. "Tele-operated driving" means in this context that an external operator controls the transportation vehicle remotely. The external operator is located in the control center. There may be a large distance between the control center and the transportation vehicle. Control center and transportation vehicle are connected via a radio communication system and their backhaul. Primarily, the radio communication system is part of a public mobile communication system such as LTE or 5G. Tele-operated driving belongs to safety-related time-critical applications and the requirements for the exchange of information are low latency, high data rate and high reliability. ToD is seen as an enabler of the automated driving, because it will solve deadlock situations in which the automated transportation vehicle gets caught.

Finally, an infrastructure network component is also shown. This may be exemplified by RSU 310. For the ease of implementation, it is considered that all components have assigned an Internet address, typically as an IPv6 address, such that the packets transporting messages between the components can be routed, correspondingly.

The various interfaces of the LTE or 5G network architecture are standardized. It is particularly referred to the various LTE and 5G specifications, which are publicly available for the sake of sufficiently disclosing further implementation details.

Figure 2:
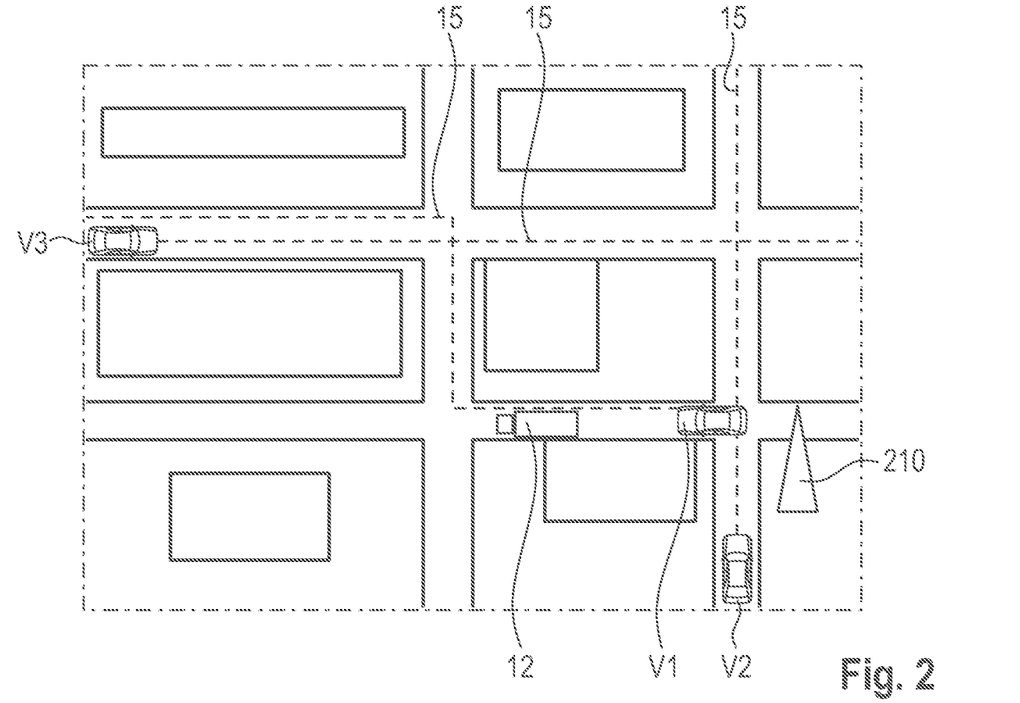
FIG. 2 shows an example scenario for a ToD session for one transportation vehicle with relaying coverage support from two other transportation vehicles based on their pQoS.

FIG. 2 shows an example scenario for a ToD session for one transportation vehicle in a mobile communication cell of a base station 210. FIG. 2 depicts a sub-urban scenario, with a plurality of streets having intersections and buildings in between. There are three transportation vehicles depicted driving on the streets. The three transportation vehicles are labelled V1 to V3. Transportation vehicle V1 is experiencing a blocking situation, which does not allow the automated driving function inside transportation vehicle V1 to move on. The reason for this is a truck 12 parking on the road for unloading goods. The street is quite narrow, such that there is not enough widths left for the transportation vehicle V1 to go forward and pass the truck. The autonomous driving function in transportation vehicle V1 does not have admissibility to drive the transportation vehicle over the sidewalk to pass a narrow point. Hence, it is a deadlock situation for transportation vehicle V1. This calls for a ToD session demanded by transportation vehicle V1. Its future path is labelled with reference sign 15. All transportation vehicles V1 to V3 are registered at base station 210. The base station 210 is informed about all paths (dashed lines) from the three transportation vehicles V1 to V3. Such information is consistently exchanged among autonomous transportation vehicles and base station 210. This also includes the exchange of position information, heading information, and acceleration information, as will be explained in more detail later.

Figure 3:
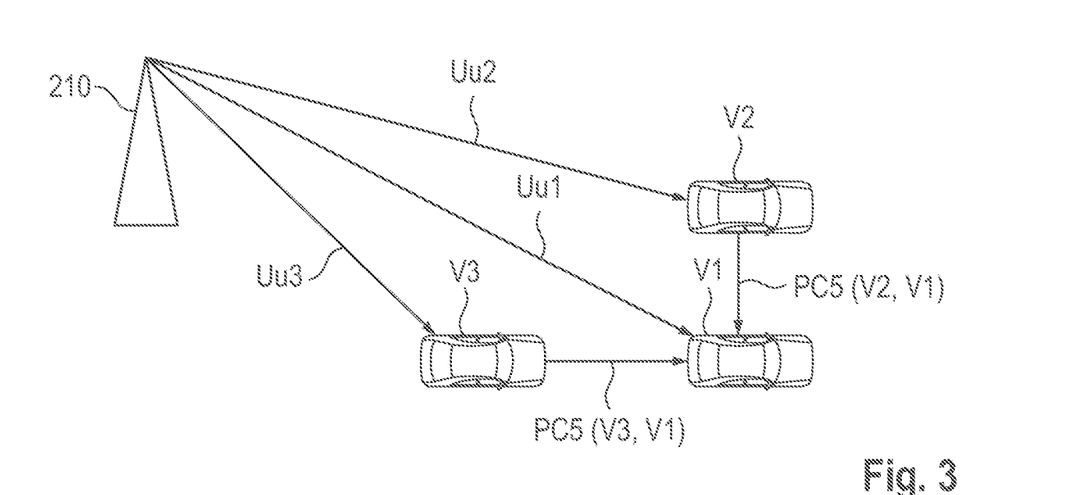
FIG. 3 illustrates direct communication links (Uu) for communications between a base station of a communication cell and three transportation vehicles and two sidelink communication links (PC5) between the transportation vehicles for serving as relaying node towards V1.

FIG. 3 illustrates direct communication links Uu1 to Uu3 for communications between a base station 210 of a communication cell and three transportation vehicles V1 to V3 and two sidelink communication links PC5 between the transportation vehicles V1 to V3 for serving as relaying node towards a first transportation vehicle V1.

Figure 4:
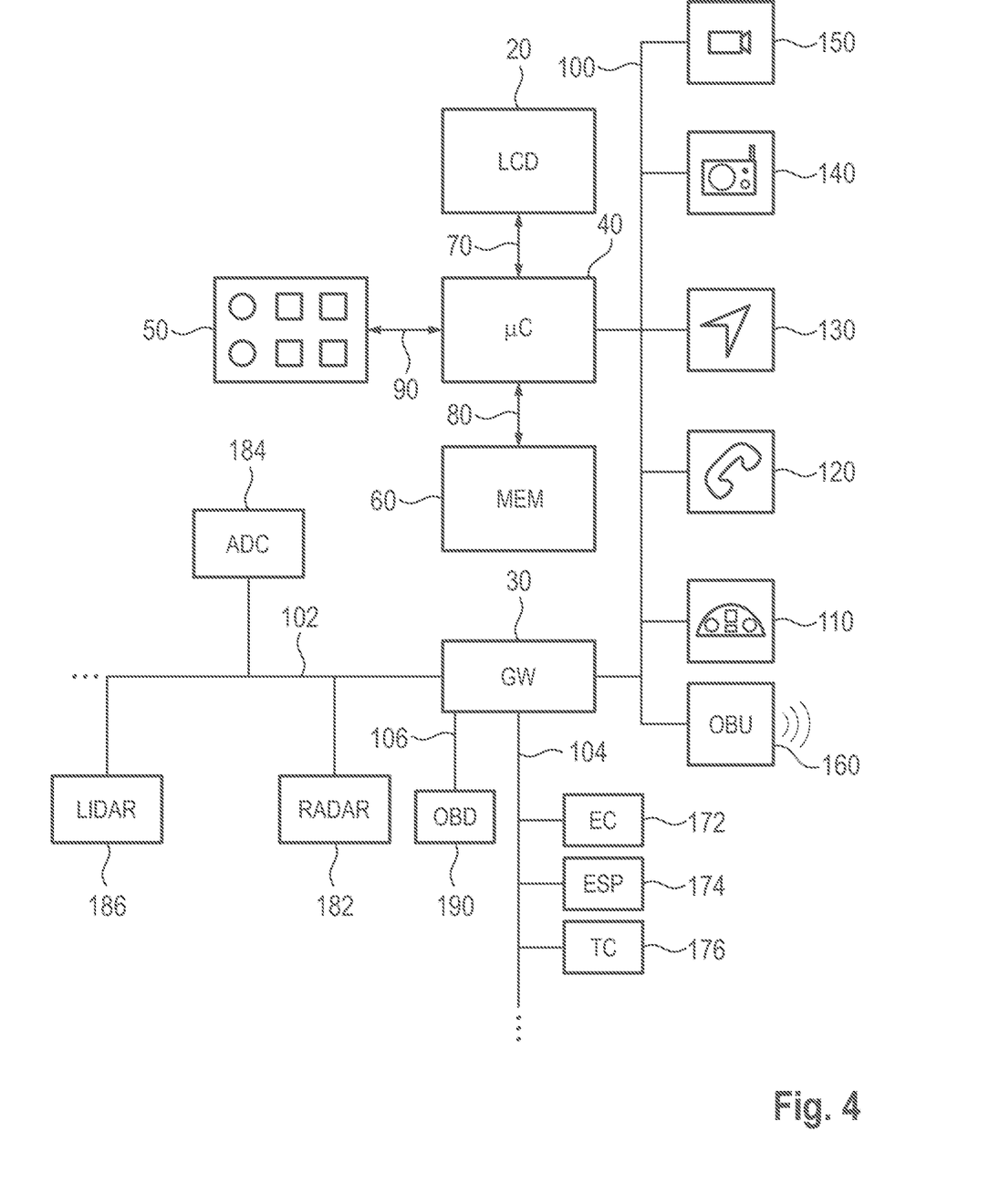
FIG. 4 shows a block diagram of an electronics system of a transportation vehicle.

FIG. 4 shows schematically a block diagram of the transportation vehicle's 10 board electronics system. Part of the board electronics system is an infotainment system which comprises: the touch-sensitive display unit 20, a computing device 40, an input unit 50, and a memory 60. The display unit 20 includes both a display area for displaying variable graphical information and an operator interface (touch-sensitive layer) arranged above the display area) for inputting commands by a user.

The memory device 60 is connected to the computing device 40 via a further data line 80. In the memory 60, a pictogram directory and/or symbol directory is deposited with the pictograms and/or symbols for possible overlays of additional information.

The other parts of the infotainment system such as camera 150, radio 140, navigation device 130, telephone 120 and instrument cluster 110 are connected via the data bus 100 with the computing device 40. As data bus 100 is the high-speed option of the CAN bus according to ISO standard 11898-2 taken into consideration. Alternatively, for example, the use of an Ethernet-based bus system such as IEEE 802.03cg is another example. Bus systems in which the data transmission via optical fibers happens are also usable. Examples are the MOST Bus (Media Oriented System Transport) or the D2B Bus (Domestic Digital Bus). For inbound and outbound wireless communication, the transportation vehicle 10 is equipped with an on-board communication module 160. This communication module 160 is often referred to as an on-board unit (OBU). It can be used for mobile communication, e.g., mobile communication according to the LTE standard or 5G standard.

Reference numeral 172 denotes an engine control unit. The reference numeral 174 corresponds to an ESC control unit corresponding to electronic stability control and the reference numeral 176 denotes a transmission control unit. The networking of such control units, all of which are allocated to the category of the drive train, typically occurs with the CAN bus system (controller area network) 104. Since various sensors are installed in the transportation vehicle and these are no longer only connected to individual control units, such sensor data are also distributed via the bus system 104 to the individual control devices.

However, the modern transportation vehicle can also have further components such as further surroundings scanning sensors like a LIDAR (Light Detection and Ranging) sensor 186 or RADAR (Radio Detection and Ranging) sensor 182 and more video cameras, e.g., as a front camera, rear camera or side camera. Such sensors are used more and more in transportation vehicles for surroundings observation. Further control devices, such as an automatic driving control unit ADC 184, etc. may be provided in the transportation vehicle. The RADAR 182 and LIDAR sensors 186 could be used for scanning a range up to 250 m or 150 m and the cameras cover a range from 30 to 120 m. The components 182 to 186 are connected to another communication bus 102. The Ethernet-Bus is a choice for this communication bus 102 due to its higher bandwidth for data transport. One Ethernet-Bus adapted to the special needs of car communication is standardized in the IEEE 802.1Q specification. Moreover, a lot of information for surroundings observation may be received via V2V communication from other road participants. Particularly for those road participants not being in line of sight LOS to the observing transportation vehicle it is very beneficial to receive the information about their position and motion via V2V communication.

Reference number 190 denotes an on-board diagnosis interface.

For the purpose of transmitting the vehicle-relevant sensor data via the communication module 160 to another transportation vehicle or to a central computer 320, the gateway 30 is provided. This is connected to the different bus systems 100, 102, 104 and 106. The gateway 30 is adapted to convert the data it receives via the one bus into the transmission format of the other bus so that it can be distributed in the packets specified there. For the forwarding of this data to the outside, i.e., to another transportation vehicle or to control center computer 320, the on-board unit 160 is equipped with the communication interface to receive these data packets and, in turn, to convert them into the transmission format of the correspondingly used mobile radio standard. The gateway 30 takes all the necessary format conversions if data are to be exchanged between the different bus systems if required.

Under the considered scenario of cooperative or autonomous driving the transportation vehicles broadcast so-called Cooperative Awareness Messages CAM, Collective Perception Messages CPM and Decentralized Environment Notification Messages DENM periodically such that they are aware which other transportation vehicles are in the vicinity. Cooperative awareness messages contain important status information from a sending transportation vehicle, such as position, speed, heading, accelerating data, etc. Since CAM messages are standardized, more detailed information about CAM, messages is provided in the ETSI standard ETSI EN 302 637-2. CAM information provides information about the traffic flow. They are compressed and transmitted to the traffic control center 320. Also a planned travel route or a section of a planned travel route may be delivered to the control center in one or more CAM messages. By aggregating these dates, average values for the speed, or number of stops can be calculated. In one example application, the traffic lights can be controlled traffic-dependent. CPM messages are specified in ETSI TS 103 324, see also ETSI TR 103 562 V2.1.1 (2019-12). In the CPM messages, V2X vehicles equipped with local perception sensors broadcast their locally perceived objects in the surroundings derived from the analysis of the sensor data. Since the environment sensors deliver picture setting information, the typical analysis algorithms correspond to image processing algorithms such as object recognition algorithms.

DENM messages hence are specified in ETSI EN 302 637-3. Such a message contains, e.g., a standardized warning message, for example, detailed information about a danger point or the traffic situation in the context of V2X communication.

The base station 210 computer can fill a database with all this information from the plurality of transportation vehicles. The base station 210 computer further can predict the QoS for the communications of Uu links to certain transportation vehicles for sections of their travel routes.

Figure 5:
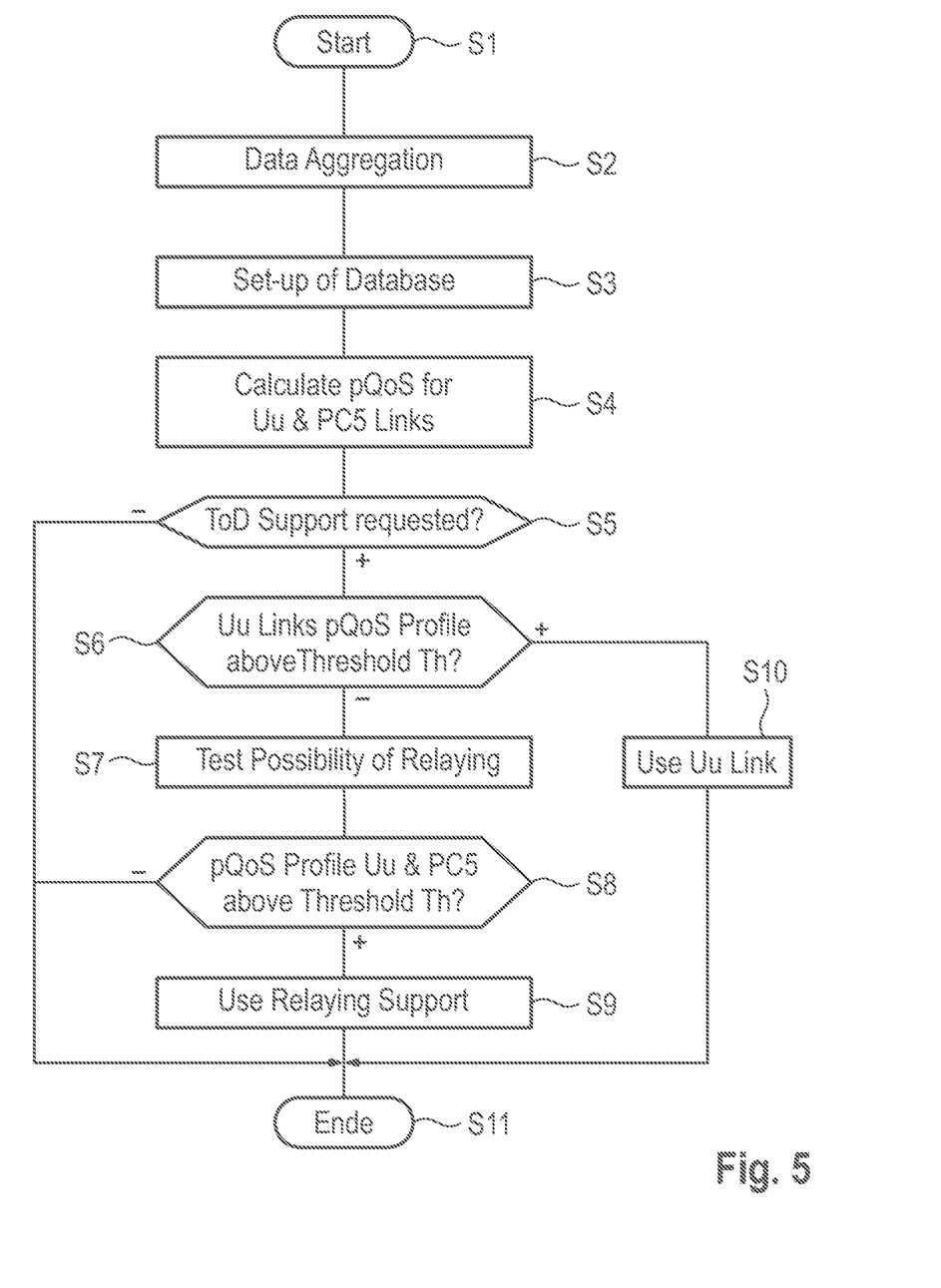
FIG. 5 shows a flow chart for a computer program.

In the following, the process of data aggregation and QoS prediction on the side of the base station 210 is explained in more detail with the help of the flow chart of FIG. 5. The start of the computer program is labelled with reference sign S1. To enable the base station 210 to do the job, it needs to have channel quality reporting messages like CQI/PMI/RI reports, which are transmitted periodically with a certain interval from the registered subscribers in the mobile communication cell. Here, CQI means Channel Quality Indicator, PMI means Pre-coding Matrix Indicator, and RI means Rank Indicator. With CQI a subscriber reports to the base station 210 the modulation scheme and coding scheme. To predict the downlink channel condition, a CQI report feedback from a UE is an input. CQI reporting can be based on PMI and RI messages. The higher the CQI value (from 0 to 15) is reported by the UE, the higher the modulation scheme (from QPSK to 64QAM) and the higher the coding rate that will be used by the base station to achieve a higher efficiency.

With a PMI report, a UE indicates to the base station 210 which precoding matrix should be used for downlink transmission which is determined by the RI report.

In an RI report, n UE indicates to the base station the number of layers that should be used for downlink transmission to the UE.

Furthermore, in addition to the above mentioned classical LTE and 5G reporting messages, the transportation vehicles V1 to V3 transmit channel quality reporting messages about the sidelink transmissions, i.e., the transmissions via PC5 link. These reporting messages up to date concern classical network metrics, such as packet delivery ratio (PDR) and received signal strength indication (RSSI), which are frequently used for this purpose. Moreover, messages with information about the maximum allowed latency requirements may be reported to the base station 210. This defines the maximum duration of time allowable between when information is available for transmission (by the sender) and when it is received by the receiver, e.g., 100 ms is a typical value for this.

All these messages are received by the base station computer 212. A plurality of messages will be aggregated in operation at S2. In operation at S3 the aggregated messages will be evaluated to update a base station owned database 214.

One example of such a database corresponds to a coverage map that informs about a certain QoS parameter such as receiving signal strength, signal to noise ratio or the like for the different Uu links or PC5 links.

An example of a coverage map for this purpose is described in the reference "Nonparametric Radio Maps Reconstruction via Elastic Net Regularization with Multi-Kernels" from M. Gutierrez-Estevez, R. Cavalcante and S. Stanczak in 2018 IEEE 19th International Workshop on Signal Processing Advances in Wireless Communications (SPAWC). This article describes the calculation of a coverage map for the QoS parameter NMSE for the signal to noise ratio SNR, where NMSE means Normalized Mean Squared Error.

The coverage map described in this paper can be calculated based on link layer information. An example for a higher layer-based QoS parameter with which also a coverage map could be calculated is the PIR time. The PIR time is defined as the interval of time elapsed between two successful beacon receptions, and is promoted in literature as a metric that describes the level of "situation-awareness" achieved onboard transportation vehicles more accurately than other parameters. With the coverage map determined in operation at S3, the base station computer calculates in operation at S4 the predicted QoS parameters for the different Uu and PC5 links in its cell. For this purpose the planned trajectories which have also been delivered to base station 210 in data aggregation phase need to be used. The pQoS parameters can be predicted for the uplink and downlink directions separately. It is noted that different frequency ranges may be used for uplink and downlink direction as well as different modulation schemes, etc.

It is noted that the skilled person often distinguishes between trajectory information and future path information, e.g., as a navigation route. Here, the trajectory information is considered to be a very accurate description in time and space of where the object will be located in future. In the field of transportation vehicle driving maneuvers, a trajectory typically is valid for the next 10 s.

A future path like a GPS track is not that accurate in space and time but lasts longer, i.e., it may have a validity of several minutes or hours.

Therefore, for the prediction of QoS parameters it makes a difference in terms of accuracy if the trajectory information is used or the future path information.

Figure 6:
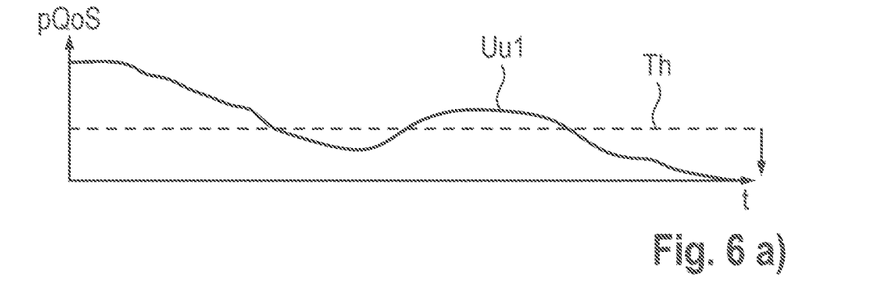
FIG. 6A shows a predicted QoS profile for the communication between base station and a first transportation vehicle via Uu link.
FIG. 6B shows a predicted QoS profile for the communication between base station and a second transportation vehicle via Uu link.
FIG. 6C shows a predicted QoS profile for the direct communication between a first transportation vehicle and a second transportation vehicle.
FIG. 6D shows a predicted QoS profile for the relaying communication between base station and first transportation vehicle supported with relaying by the second transportation vehicle.

With regard to the scenario depicted in FIG. 2, the base station computer 212 in operation at S4 predicts the coverage which transportation vehicle V1 will experience on the planned trajectory 15 and it does the same for transportation vehicles V2 and V3. FIG. 6A shows a pQoS profile for the Uu1 link. FIG. 6B shows a pQoS profile for the Uu3 link. FIG. 6C shows a pQoS profile for the PC5 link for direct communication between transportation vehicles V3 and V1. The pQoS parameter noted along the ordinate is the receiving signal power. It is however noted that a different QoS parameter may be used alternatively, such as Doppler compensation information, latency information, data rate information, throughput information, packet error rate information, signal to noise ratio, and packet inter-reception time (PIR). Along the abscissa the time information is noted.

In operation at S5 it is checked if from any of the transportation vehicles V1 to V3 registered at the base station 210 a request for support by a ToD session has been received. If not, the program is ended in operation at S11. If yes, it will be checked for the transportation vehicle demanding the ToD session, if the pQoS profile is above a threshold Th. In the scenario of FIG. 2, the transportation vehicle V1 will send the request for a ToD session as explained above. Here, the ToD application requires a minimum receiving signal power or a minimum requirement for a different pQoS parameter such as PIR time, etc. If this threshold might be violated based on the pQoS profile, then the base station 210 evaluates if it can establish a relaying support via other nodes (transportation vehicles, road side units 310, traffic lights, etc.) to increase the received power. In FIG. 6A, it is seen that the pQoS profile for Uu1 link violates the minimum requirement. The curve for the pQoS profile drops below the threshold Th for a certain time interval, increases again and stays above the threshold Th for another time period and drops below the threshold for the rest of the pQoS profile. FIG. 6B depicts the Uu3 link pQoS profile. Since transportation vehicle V3 has the greatest distance to the base station 210, the pQoS profile does not fulfill the minimum requirement at the beginning but is good enough for the rest of the time since according to the planned trajectory 15 transportation vehicle V3 approaches the base station 210. FIG. 6C shows a pQoS profile for the sidelink communication from transportation vehicle V3 to V1. It shows a similar form with a drop down at the beginning and an increase to sufficient QoS thereafter since both transportation vehicles are approaching. Of course, the environments of the approaching transportation vehicles also play a role. But this can also be taken into consideration for QoS prediction based on the information in CPM and DENM messages as mentioned above.

The checking of the Uu link pQoS profile for the requesting transportation vehicle happens in operation at S6. If the Uu link profile fulfills the requirement, it will be decided to use the Uu link for the requested ToD session. A corresponding entry will be set in a register memory in operation at S10. At the same operation, a corresponding message is sent to the demanding transportation vehicle V1 to inform it about this selection. If it has been found in operation at S6 that the pQoS profile does not fulfill the minimum requirements, it follows in operation at S7 the testing of the possibility of using relaying for fulfilling the minimum requirement for the requested ToD session. The base station 210 needs to know if the sidelink communication between V1 and another transportation vehicle may be used to guarantee the minimum requirement for the ToD session. This is not always possible. Particularly, since with relaying some more latency will be added to the communication process, it might be possible that relaying is not an option even though the receiving signal power is good enough. That's why the higher layer indicator packet inter-reception time is a better choice for determining a pQoS profile. Optionally, the operation at S7 includes an operation of calculating a combined pQoS profile out of the profiles for the Uu3 and PC5 (V3, V1) link. FIG. 6D shows a resulting pQoS profile for the combination of Uu3 and PC5 (V3, V1) link. As seen in FIGS. 6A and 6D, where the Uu1 link profile drops below the threshold Th, the combined profile exceeds the threshold Th. This shows that relaying could help to maintain the ToD session for the section of the trajectory 15 for which transportation vehicle V1 has requested ToD support. In operation at S8 it is checked if the combined profile for relaying might be used at the trajectory section where the Uu1 pQoS profile drops below the threshold Th. If not, the program is ended in operation at S11. If the result in query S8 is that both profiles complement each other, it follows in operation at S9 the setting of a corresponding entry in the register memory and the sending of a message to demanding transportation vehicle V1. The ToD session will be invoked by transportation vehicle V1 by sending a ToD session request message to the backend server 320 in the control center.

Figure 7:
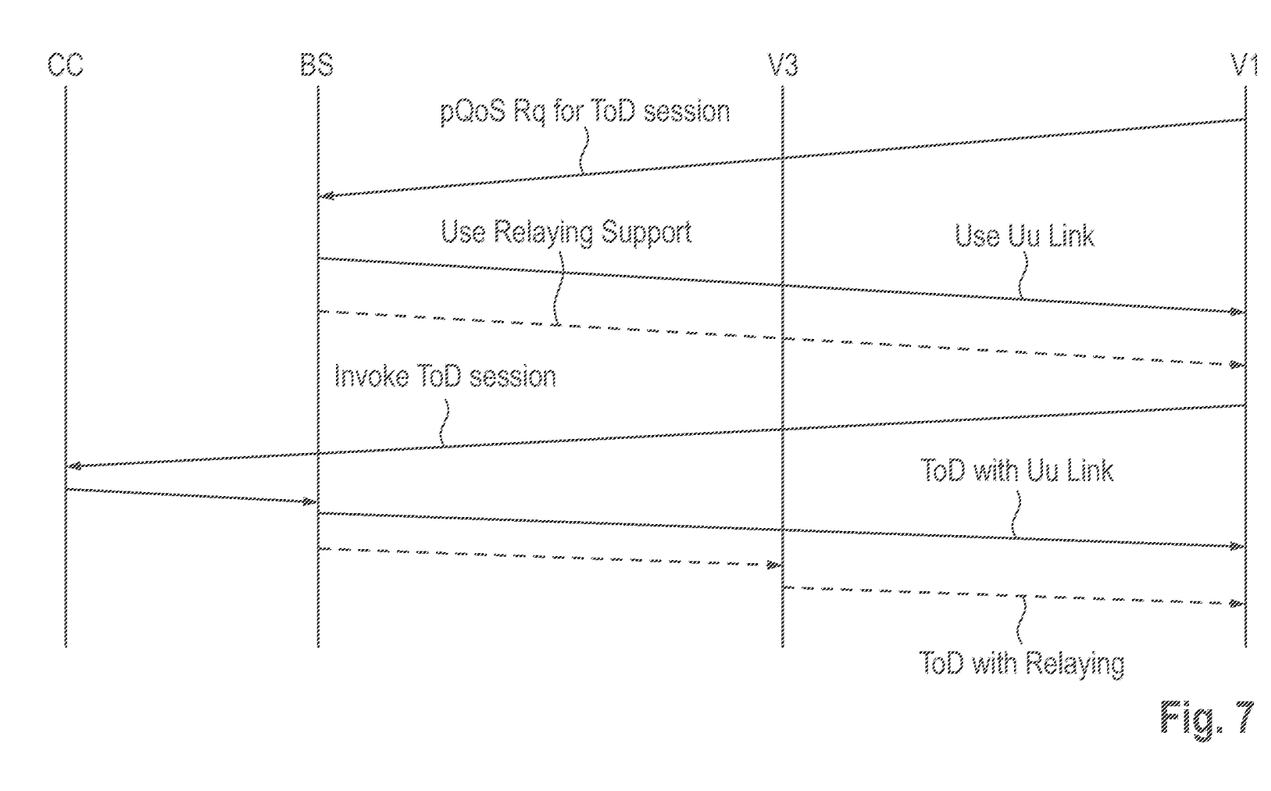
FIG. 7 shows a message exchange between control center, base station and transportation vehicles for a tele-operated driving session.

FIG. 7 shows the message exchange between control center with backend server 320, the base station and the involved transportation vehicles V1 and V3. First, the transportation vehicle V1 in need of ToD support sends a request to base station 210 for a predicted QoS profile. The base station 210 answers either with the message to use the Uu link for ToD session communication if pQoS profile is good enough or answers with a message to use relaying support if not good enough. After that the transportation vehicle V1 invokes the ToD session by sending a message to the backend server 320 in the control center. The backend server 320 starts sending ToD messages to the base station 210. The base station 210 uses the Uu link or the relaying support for exchanging the ToD messages with transportation vehicle V1.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to and executed by a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the way in which the proposed method and apparatus is programmed. Given the teachings herein, one of ordinary skill in the related art will be able to contemplate these and similar implementations or configurations of the proposed method and apparatus.

REFERENCE SIGN LIST

10 Transportation vehicle
12 Truck
15 Planned trajectory
20 Touch Screen
30 Gateway
40 Computing Device
50 Operation Element Unit
60 Memory Unit
70 Data Line to Display Unit
80 Data Line to Memory Unit
90 Data Line to Operation Element Unit
100 $1^{st}$ Communication Bus
102 $2^{nd}$ Communication Bus
104 $3^{rd}$ Communication Bus
106 $4^{th}$ Communication Bus
110 Multifunction Display
120 Telephone
130 Navigation System
140 Radio
150 Camera
160 On-Board Communication Unit
172 Engine Control Unit
174 Electronic Stability Control Unit
176 Transmission Control Unit
182 RADAR Sensor
184 Automatic Driving Control Unit
186 LIDAR Sensor
190 On-Board Diagnosis Unit
200 Evolved Packet Core
210 Base Station
212 Base Station Computer
300 Internet
310 Road Side Unit
320 Backend Server
PC5 (V2, V1) $1^{st}$ PC5 Communication Link
PC5 (V3, V1) $2^{nd}$ PC5 Communication Link
Uu1-Uu3 Uu Communication Links
V1-V3 Transportation vehicles
S1-S11 Various Method Operations of a Computer Program

The invention claimed is:

1. A transportation vehicle comprising: a communication module; and a processing device that forms a message for requesting a communication from or to a base station, wherein the request demands a specified quality of service, wherein the communication module sends the formed message and receives a message from the base station informing about a need for relayed communication for the requested communication demanding the specified quality of service, wherein the processing device registers the need for relayed communication in a memory, wherein the registered information includes position information or time information from which the relayed communication needs to be provided, wherein the communication between the base station and the transportation vehicle is managed by: collection of service quality reporting messages from a plurality of moving communication partners registered in a communication cell managed by the base station, the service quality reporting messages including service quality reporting messages for direct communications between two of the plurality of moving communication partners, which includes the transportation vehicle as one of the plurality of moving communication partners; generation of quality of service maps for the communications between the base station and the transportation vehicle, as well as for the direct communications between two of the plurality of moving communication partners; receipt of planned trajectories from the plurality of moving communication partners; calculation of predicted quality of service profiles for the communications between the base station and a moving communication partner as well as predicted quality of service profiles for the direct communications between the plurality of moving communication partners based on the generated quality of service maps and the planned trajectories, the predicted quality of service profiles representing a temporal evolution of at least one quality of service parameter; receipt of a request from the transportation vehicle for a communication between the base station and the transportation vehicle, the request demanding a specified quality of service; determination, based on the predicted quality of service profiles, whether the specified quality of service demanded by the request is satisfied along the planned trajectory of the transportation vehicle by a direct communication between the base station and the transportation vehicle or by relay of the communication via one of the other moving communication partners, wherein the determination of whether the specified quality of service is satisfied is based on comparison of the at least one quality of service parameter represented by the predicted quality of service profile for the communication between the base station and the transportation vehicle with a threshold representing a minimum requirement which the quality of service parameter satisfies; and establishment of the communication between the base station and the transportation vehicle accordingly along the planned trajectory.

2. The transportation vehicle of claim 1, wherein determination of whether the specified quality of service demanded by the request is satisfied along the planned trajectory of the transportation vehicle by relaying the communication via one of the other moving communication partners, a moving communication partner in the vicinity of the transportation vehicle is selected, a combined predicted quality of service profile is calculated, the combined predicted quality of service profile represents a temporal evolution of at least one quality of service parameter when the communication is relayed via the selected moving communication partner, and the at least one quality of service parameter represented by the combined predicted quality of service profile is compared with the threshold.

3. The transportation vehicle of claim 1, wherein, along the planned trajectory, a change between direct communication and relayed communication between the base station and the transportation vehicle is performed.

4. The transportation vehicle of claim 3, wherein a position or time information from which the relayed communication is started is recorded.

5. The transportation vehicle of claim 1, wherein a message is sent to the transportation vehicle about the communication that is established between the base station and the transportation vehicle.

6. The transportation vehicle of claim 1, wherein the moving communication partners are transportation vehicles equipped with an on-board communication module capable of performing vehicle-to-everything communication, including performing communication to the base station via Uu-link and direct communication from transportation vehicle to transportation vehicle via PC5-link.

7. The transportation vehicle of claim 1, wherein the request demanding the specified quality of service corresponds to a requested tele-operated driving session.

8. A method for managing a communication between a base station of a cellular mobile communication system and a first moving communication partner, the method comprising: collecting service quality reporting messages from a plurality of moving communication partners registered in a communication cell managed by the base station, the service quality reporting messages including service quality reporting messages for direct communications between two of the plurality of moving communication partners; generating quality of service maps for the communications between the base station and the first moving communication partner, as well as for the direct communications between two of the plurality of moving communication partners; receiving planned trajectories from the plurality of moving communication partners; calculating predicted quality of service profiles for the communications between the base station and a moving communication partner as well as predicted quality of service profiles for the direct communications between the plurality of moving communication partners based on the generated quality of service maps and the planned trajectories, the predicted quality of service profiles representing a temporal evolution of at least one quality of service parameter; receiving a request from the first moving communication partner for a communication between the base station and the first moving communication partner, the request demanding a specified quality of service; determining, based on the predicted quality of service profiles, whether the specified quality of service demanded by the request is satisfied along the planned trajectory of the first moving communication partner by a direct communication between the base station and the first moving communication partner or by relaying the communication via one of the other moving communication partners, wherein the determination of whether the specified quality of service is satisfied is based on comparison of the at least one quality of service parameter represented by the predicted quality of service profile for the communication between the base station and the transportation vehicle with a threshold representing a minimum requirement which the quality of service parameter satisfies; and establishing the communication between the base station and the first moving communication partner accordingly along the planned trajectory.

9. The method of claim 8, wherein determining whether the specified quality of service demanded by the request is satisfied along the planned trajectory of the first moving communication partner by relaying the communication via one of the other moving communication partners, a moving communication partner in the vicinity of the first moving communication partner is selected, a combined predicted quality of service profile is calculated, the combined predicted quality of service profile represents a temporal evolution of at least one quality of service parameter when the communication is relayed via the selected moving communication partner, and the at least one quality of service parameter represented by the combined predicted quality of service profile is compared with the threshold.

10. The method of claim 8, wherein, along the planned trajectory, a change between direct communication and relayed communication between the base station and the first moving communication partner is performed.

11. The method of claim 10, further comprising recording a position or time information from which the relayed communication is started.

12. The method of claim 8, further comprising sending a message to the first moving communication partner about the communication that is established between the base station and the first moving communication partner.

13. The method of claim 8, wherein the moving communication partners are transportation vehicles equipped with an on-board communication module capable of performing vehicle-to-everything communication, including performing communication to the base station via Uu-link and direct communication from transportation vehicle to transportation vehicle via PC5-link.

14. The method of claim 8, wherein the request demanding the specified quality of service corresponds to a requested tele-operated driving session.

15. An apparatus for managing a communication between a base station of a cellular mobile communication system and a first moving communication partner, the apparatus comprising a processing device adapted to perform the method of claim 8.

16. A non-transitory computer readable medium including a computer program comprising program code, which, when run in a processing device, causes the processing device to perform the method of claim 8.

* * * * *